United States Patent [19]

King

[11] Patent Number: 4,955,743

[45] Date of Patent: Sep. 11, 1990

[54] RACK BEAM LATCH

[75] Inventor: John R. King, West Bloomfield, Mich.

[73] Assignee: S&K Enterprises, Inc., Detroit, Mich.

[21] Appl. No.: 431,388

[22] Filed: Nov. 3, 1989

[51] Int. Cl.$^5$ ............................ B25G 3/00; F16B 9/00
[52] U.S. Cl. ...................................... 403/254; 211/192
[58] Field of Search .................. 403/254, 316; 211/192

[56] References Cited

U.S. PATENT DOCUMENTS

| | | | |
|---|---|---|---|
| 3,303,937 | 2/1967 | McConnell | 211/192 |
| 3,346,126 | 10/1967 | Bloom et al. | 211/192 |
| 3,612,290 | 10/1971 | Evans | 211/192 |
| 3,702,137 | 11/1972 | Evans | 211/192 |

Primary Examiner—Andrew V. Kundrat
Attorney, Agent, or Firm—Harness, Dickey & Pierce

[57] ABSTRACT

In a frame type rack having horizontal beams whose ends are adjustably fastened to vertical posts by headed pins that extend into holes formed in the posts, a latch is provided that prevents inadvertent release of the beam pins from the holes in the post. The post holes are widened at their tops for insertion of the pins and narrowed at their bottoms to engage and prevent removal of the pins therefrom. The latch includes a plate, which is fastened to the end of the beam, and upon which three vertically aligned pins are secured for extending into corresponding holes in the post. A cover strip overlaps the plate and the upper pin which, also, rigidly secures the cover strip to the plate. A slidable spring member is held between the inner portion of the cover strip and the plate and extends beneath it. Vertical openings in the spring member receive outer end portions of the middle and lower pins. A projection of the spring member fits through an aligned hole in the plate and into the hole in the post that receives the lower pin. The projection can be moved upwardly or outwardly relative to the pin in its hole by sliding and resiliently bending the spring member so that when the projection is in the hole, it restrains its pin from moving into the widened portion of the hole from which it can be released and, conversely, when moved, frees the pin for manual movement into the widened portion of the hole for removal to disconnect the beam from the post.

11 Claims, 1 Drawing Sheet

U.S. Patent
Sep. 11, 1990
4,955,743
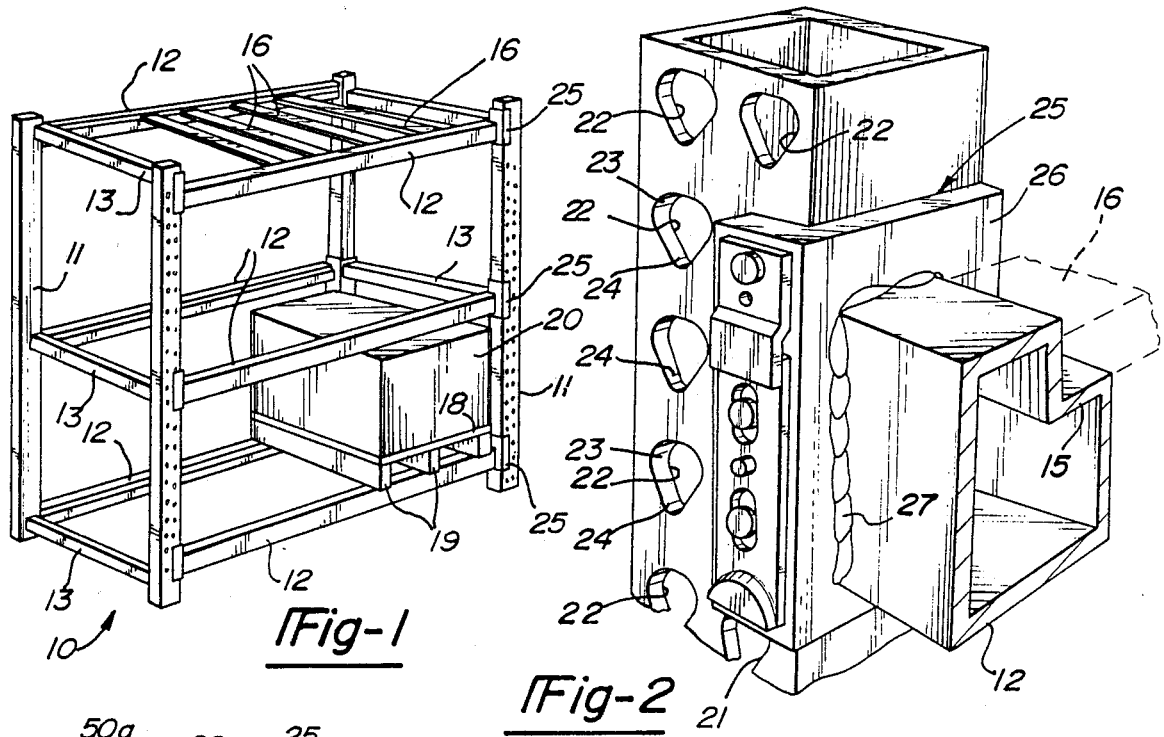
Fig-1
Fig-2
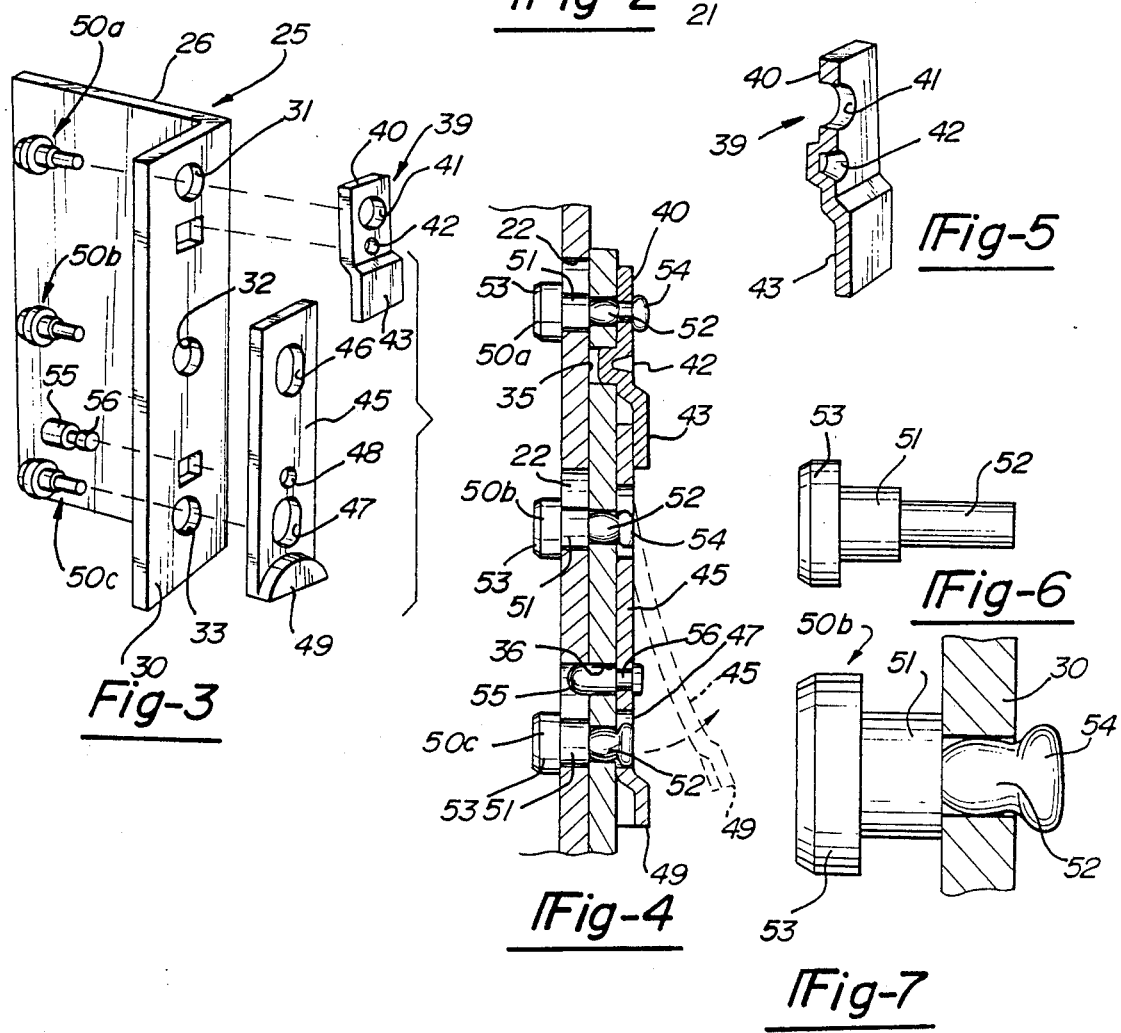
Fig-3
Fig-4
Fig-5
Fig-6
Fig-7

RACK BEAM LATCH

BACKGROUND OF INVENTION

This invention relates to a latch which prevents the inadvertent disengagement of the horizontal support beams from the vertical support posts in a pallet type of rack or similar heavy duty, load supporting frame.

A pallet type rack, or similar support frame, is made of vertical support posts which are interconnected by horizontal beams. Shelf forming slats or sheets may be arranged upon and extend between opposing beams for supporting loads. Alternatively, the beams may be used alone, like shelves, with loads resting upon and spanning opposed beams. Loaded pallets or containers or similar large objects may be positioned upon the shelf forming slats or sheets or may be arranged upon the beams themselves. Thus, the rack or frame is, in essence, an open shelving arrangement.

In heavy duty pallet type racks or similar types of frames that are used to support heavy loads, the ends of the beams are adjustably connected to their respective posts. One form of connection which is conventionally used involves providing a series of vertically spaced apart holes in the posts. The posts are typically formed of roll formed sheet metal tubing. The holes are provided in one or more of the vertical faces of the tubing. For this purpose, the tubing may be square or rectangle or similarly configured in cross-section.

The ends of each of the beams are usually provided with an angle bracket having pins that interlock with the holes in the posts. That is, the beam ends are welded or bolted to one leg of the bracket. Another leg of the bracket is provided with several horizontal pins which extend through corresponding holes in the adjacent post for temporarily fastening the post and beam together. Conventionally the pins have enlarged heads and the holes in the posts are bayonet-slot or inverted teardrop in shape so that the heads may be inserted through the wide portions of the holes and the stems of the pins may be gripped in the narrowed portions of the holes.

The beams may be attached to the posts at different heights by inserting their pins through the post holes that are located at the desired height. When the pins are inserted, the beams drop down slightly so that the stems of their pins drop into the narrowed portions of their respective post holes. The heads of the pins prevent withdrawal from the holes. Conversely, the beams may be removed or disengaged simply by moving them upwardly a short distance so that the heads of their pins may pass through the widened portions of the holes for withdrawing the pins from the holes within which they are engaged.

Typically, the beams are formed of rolled sheet metal with square or rectangular or similarly configured cross-sectional shapes. Their ends may be suitably welded to the angle brackets. An example of this type of pallet rack or frame construction is disclosed in my prior Pat. No. 4,760,682, issued Aug. 2, 1988, for a tubular rack beam and method of making same.

Because the loads placed upon this type of heavy duty rack are substantial, it is common to use mechanical handling equipment, such as fork trucks, lift vehicles and the like. When this equipment is used, from time to time, the beams are jostled or pushed or struck by the equipment. Consequently, the beam ends may be raised sufficiently to cause their fastening pins to inadvertently disengage from the holes in which they are fitted. In that event, it is possible for the beam to fall out of position and to cause a load to fall off the rack or to undesirably shift position during loading or unloading. Thus, it is desirable to provide a suitable safety latching device which prevents the beam pins from inadvertently disengaging from their holes. However, such safety latches must be easy to use, inexpensive, and easily replaceable. The invention herein relates to a safety latch construction for use in preventing unwanted disengagement of the beams from the posts in a rack or similar frame type of construction.

DESCRIPTION OF INVENTION

This invention relates to a safety latch means for preventing inadvertent disengagement of the pins which releasibly connect the ends of the horizontal beams to the pin receiving holes formed in the vertical posts of a rack or frame construction. In that construction, the posts are provided with vertically aligned holes which may be selectively used for receiving pins fastened upon a bracket plate which is secured to the end of a beam. The pins fit through upper, widened portions of the holes and drop down to seat within narrowed, lower portions of the holes. In order to prevent the pins from being moved upwardly into the widened portions of the holes, the latch includes a keeper pin which extends through a hole in the plate and into a post hole containing one of the pins so as to block that pin from moving upwardly into the widened portion of the hole for removal. The keeper pin may be manually moved out of position to permit the pin to be lifted into the widened portion of the hole for disengagement when desired.

The keeper pin is mounted on a vertically elongated, substantially flat strip or sheet-like, springy metal member which overlaps and rests against the face of the plate. The metal member is provided with a pair of slightly vertically elongated holes which overlap and are aligned with holes formed in the bracket plate. Pins extend through those holes. These pins are immovably fixed within the plate holes, but are loosely inserted within the holes in the springy metal member. Hence, the springy metal member may be manually, resiliently bent away from the plate, and the pins, for some distance for moving the keeper pin endwise out of the post hole in which it is positioned.

More specifically, the keeper pin is mounted on the springy member between its two openings and extends perpendicularly to the springy member. Thus, the keeper pin extends through a receiving hole formed in the plate and into the upper or widened end of the post hole which receives the lowermost pin. While in the post hole, the keeper pin blocks or restrains the lowermost pin from being raised in its post opening. This prevents unintended disengagement of the pin from its post hole.

The upper end of the spring member is held in place against the plate by a hold-down plate or cover strip which has a lower portion that overlaps the springy member and an upper portion that is fastened to the bracket plate by the outer end of the uppermost pin on the plate. Preferably the plate is provided with three pins, each of which has an outer, extension portion that positions the latch parts on the plate and a headed inner portion, for fastening the plate to the post.

This latch is simple and inexpensive in construction and, particularly, the spring member may be easily removed and replaced in the event of damage thereto. Significantly, it operates to prevent inadvertent disengagement of the beam pins but can be easily moved manually, without special tools other than something like a coin or a screwdriver, to deliberately disengage the latch for removal of the beam.

One of the principal objects of this invention is to provide an inexpensive, easily operated, generally foolproof latch which will prevent inadvertent disengagement of the beam pins from their post pin receiving holes but, which is rapidly and easily operable for disengagement, when desired, without the need for special tools.

Yet another object of this invention is to provide an extremely simple latching mechanism construction, formed of a minimal number of parts, having a low profile, i.e., being closely adjacent the vertical posts so as not to extend outwardly therefrom where they may be inadvertently damaged, for protecting against inadvertent disengagement of the horizontal beams from the vertical posts in a typical pallet type or frame storage rack.

These and other objects and advantages of this invention will become apparent upon reading the following description, of which the attached drawings form a part.

DESCRIPTION OF DRAWINGS

FIG. 1 is a perspective view of a typical pallet type rack or frame with a loaded pallet supported thereon.

FIG. 2 is an enlarged, perspective, fragmentary view showing the connection, including the latch, between one end of a horizontal beam and a vertical post.

FIG. 3 is a perspective, disassembled view of the parts of the latch.

FIG. 4 is an enlarged, cross-sectional view of the latch securing the beam plate to the post.

FIG. 5 is a cross-sectional, perspective view of the latch hold-down plate or cover member.

FIG. 6 is an enlarged illustration of a rivet-like pin before assembly of the latch.

FIG. 7 is an enlarged, fragmentary view of the pin assembled upon the bracket plate.

DETAILED DESCRIPTION

FIG. 1 schematically illustrates a pallet type or frame type rack 10. In general, the rack is formed of vertical posts 11 which are connected together by horizontal front and rear beams 12 and side braces 13. The posts are made of heavy gauge sheet metal rolled into a rectangular or open C-shaped cross-section. Similarly, the beams 12 are roll formed out of strong, heavy gauge sheet metal, into a predetermined cross-sectional configuration, such as approximately rectangular or square.

The beams 12 may have step-like ledges 15 formed in their upper edges. These steps are used for positioning wood or metal slats 16 which extend from front to rear between the beams. Alternatively, flat boards may be placed upon the step-like ledges to span the space between the front and rear beams for forming shelving.

Pallets or boxes or various kinds of containers or articles may be stored upon the rack shelving. Thus, by way of example, FIG. 1 illustrates a typical pallet 18, having wood skids 19 resting upon the front and rear lower beams for storing a load 20 positioned upon the pallet.

The vertical posts 11 are provided with one or two vertical rows of spaced apart holes 22 which are used for fastening the beams in different positions along the height of the posts. These holes 22 are inverted teardrop shaped or bayonet-slot shaped so that they have wide upper end portions 23 and narrow lower end portions 24.

The beam ends are fastened to the posts, and more specifically to selected holes in the posts, by means of an angle bracket 25. The bracket may be U-shaped, for embracing three sides of the posts, or it may be right angle shaped, as illustrated in the drawings. One of the legs of each bracket is formed as an end plate 26 against which an end of a beam 12 is welded, as illustrated by the weld 27. (See FIG. 2). Other forms of fastening may be utilized, such as bolts, rivets or the like for fastening the ends of the beams to their brackets.

The brackets each include a leg which is formed as a side fastening plate 30 which covers three of the holes 22 in the portion of the post which it overlaps. The plate 30 has an upper hole 31, a middle hole 32 and a lower hole 33 which are aligned with the three post holes which they overlap.

In addition, the bracket plate 30 is provided with an upper opening 35 located just beneath the upper hole 31 and a lower opening 36 located just above the lowermost hole 33 in the plate. These holes 35 and 36 may be square in shape or they may be round.

The latch itself is formed of a rigid metal strip which forms a cover member 39. The cover member is divided into an upper portion 40 arranged in face to face contact with the bracket plate 30. A hole 41 in the upper portion is aligned with the bracket hole 31 and, ultimately, with the hole in the post which is aligned with that bracket.

The cover member also includes a punched or lanced-out projection 42 which forms a generally circular bump that is arranged to closely fit within the upper hole 35 in the plate. The projection aligns the cover member relative to the plate and holds the cover member against sidewise movement. The portion of the cover member below the projection is bent outwardly and downwardly in parallelism with the plate surface to provide a lower portion 43 that is spaced a short distance from the plate surface.

A flat, resilient sheet metal, spring member 45 is positioned against the plate surface and in the space between the cover member lower portion 43 and the plate surface. (see FIG. 4). The spring member is provided with an upper aperture which is vertically elongated to provide a vertically extending slot 46 that is aligned with the middle hole 32 in the plate 30. Likewise, the spring member has a lower aperture 47 which is aligned with, and vertically elongated relative to the lower hole 33 in the plate 30. A hole 48 is located in the spring member above the slot 47.

The spring member is formed of a springy steel material so that it may be grasped at its lower end and bent outwardly, as indicated by the dotted lines in FIG. 4. For that purpose, the lower end of the spring member may have an outwardly bent grip 49 which can be grasped by human fingers or which can receive a screwdriver or a coin for bending the spring member.

The bracket plate 30 is fastened to the vertical post holes by means of a series of rivet-like pins 50a, 50b, and 50c. As illustrated in FIG. 6, these pins each have a shaft with a large diameter portion 51 and a smaller diameter portion 52. An enlarged head 53 is formed on the large diameter portion. In addition, the free end of the shaft smaller diameter end portion 52 is staked or pressed into an enlarged head 54 when the parts are assembled.

The upper pin 50a is arranged with its shaft smaller diameter portion 52 extending through the upper hole 31 in the plate 30 and also extending through the hole 41 in the cover member 39. The shaft is expanded laterally in those openings and its head 54 is formed by pressure for rigidly fastening the pin within the holes and, thereby, rigidly connecting the plate 30 and the cover member together. The head 54 of that pin overlaps and holds the cover member upon the plate. The sidewise distortion of the pin 50a is shown in exaggerated form in FIG. 7.

The middle pin 50b extends through the aligned holes 32, in plate 30, and slot-like hole 46 in the spring member 45. The larger diameter portion 51 of the pin is expanded to lock the pin with the hole 32 in the plate. The head 54 of this pin freely fits between the side portions defining the slot 46 in the member 45. The smaller diameter portion 52 of the shaft loosely extends through the slot 46.

The lowermost pin 50c, has its larger diameter stem or shaft portion 51 extending through the lower hole 33 in the plate 30 where it is expanded so as to remain fixed in place. This stem's smaller diameter portion 52 loosely fits in the lower slot 47 in the spring member.

The spring member 45 is provided with an inwardly extending keeper pin 55 which has a groove portion 56 fixed within the opening 48 in the spring member. The keeper pin may be moved endwise; inwardly or outwardly of the upper portion of the lowermost post hole 22 in the series of three holes that receive the pins for connection of the plate 30 to the post. (See FIG. 4).

As can be seen in FIG. 4, the latch spring member 45 and cover member 39 are mounted upon the surface of the bracket plate or leg 30. The enlarged diameter stem or shaft portions 51 of the pins extend outwardly from the plate 30 so that they may be inserted within selected holes 22 in the post 11. The pins are actually inserted at the wide upper ends 23 of the holes so that their heads 53 pass through the holes. Then, the plate 30 is lowered slightly so that the stems of the pins settle into the narrow lowermost portions 24 of the holes 22 where they are engaged by the material defining the holes.

The keeper pin 55, which is positioned in the same hole as the lowermost pin 50c, prevents the lowermost pin from rising into the widest portion of its hole so that it cannot be disengaged from that hole. That secures the pin against inadvertent withdrawal. As a result, all of the pins are equally secured. To release the bracket from the post, the spring member may be resiliently bowed outwardly, as indicated in dotted lines in FIG. 4, so that its keeper pin 55 is pulled outwardly of the hole 22. That permits the pins, with the bracket, to be raised upwardly so that the pins may be pulled out of their holes. The keeper pin may be moved slightly upwardly or downwardly to accommodate slight inaccuracies in locations of the holes.

In the event of damage to the keeper pin or to the spring member, which are essentially the only portions that might be damaged in use of the unit, the spring member can be disassembled by moving its keeper pin from the hole 36 and sliding the spring member downwardly and outwardly from beneath the cover member. Then, a new spring member can be inserted.

This invention may be further developed within the scope of the following claims. Accordingly, it is desired that the foregoing description be read as illustrative of an operative embodiment of this invention and not in a strictly limiting sense.

Thus, having fully described an operative embodiment of this invention, it is now claimed:

1. A rack beam latch for securing the end of a generally horizontally arranged beam to a vertical support post having a series of similar, vertically aligned, pin receiving openings formed therein, with the beam end having an end plate which overlaps some of the openings, and with pins formed on the end plate and extending into said openings for connecting the beam to, and for supporting the beam upon, the support post, and with the pin receiving openings being vertically elongated and having upper portions that are widened relative to their lower, narrowed portions and the pins being formed to loosely fit through the opening upper portions for insertion and removal therefrom, but formed to be closely fitted and held within the lower portions of the openings to prevent removal therefrom; said latch comprising:

an upper, sheet-like cover member positioned upon said end plate and having an upper portion fastened to the end plate and an integral lower portion bent a short distance from and arranged parallel to the end plate to form a space therebetween, so as to have said cover member in it entirety immovable relative to the plate;

a lower sheet-like spring member overlapping the plate and having an upper part snugly fitted within said space and an integral lower part extending below the upper cover member, and including means for positioning the spring member to the plate;

a latching protuberance provided on the lower part of the spring member and extended through a latching hole formed in the plate for extending into one of the support post pin receiving openings above a pin received in that opening, to prevent movement of that pin from the narrowed portion to the widened portion of the opening;

the lower part of said spring member being manually resiliently bendable away from the portion of the plate which it overlaps for moving the latching protuberance endwise out of said post opening for allowing the pin in that post opening, as well as other pins on the plate which are fitted in adjacent openings, to be manually removed upwardly into the widened portions of their respective openings for endwise removal therefrom, but otherwise the latching protuberance restrains the pins from movement out of the narrowed portions of their openings.

2. A rack beam latch as defined in claim 1, and including one of said plate pins having an outer extension portion that extends through aligned openings formed in the plate and the cover member upper portion and rigidly fastens the plate and cover member together, and the pin having an inner extension portion for fitting into an opening in the post.

3. A rack beam latch as defined in claim 2, and including an integral embossment formed in the coverplate upper portion and extending into and snugly fitted within a corresponding opening formed in the plate for holding the cover member in position upon the plate.

4. A rack beam latch as defined in claim 1, and said means for slidably positioning the spring member upon the plate including at least one of the plate pins having an outer extension portion extending through aligned openings in the plate and spring member.

5. A rack beam latch as defined in claim 4, and with a second plate pin having an outer extension portion extending through aligned openings in the spring member and plate, with the plate pins located on opposite sides of the protuberance and its latching hole and with the second plate pin having a free end portion that extends through an opening in the spring member for positioning the spring member against the plate.

6. A rack beam latch as defined in claim 4, and with said opening in the spring member being above the protuberance;

and a lower opening formed in the spring member below the protuberance;

a plate pin having an end extension fitted into said lower opening, for holding the spring member against sidewise movement, whereby the sheet member may be resiliently bent in a direction away from the pins for endwise disengaging the protuberance from the plate opening within which it is fitted.

7. A rack beam latch as defined in claim 6, and with the lowermost edge of the spring member being bent away from the plate to form a grip for manually engaging the spring member and moving it relative to the plate.

8. A latch for securing the end of a beam to a support post having a series of aligned, pin receiving openings therein, with the beam end having an end plate which overlaps some of the openings and is provided with three pins arranged to extend into three of said pin receiving openings for connecting the beam to, and for supporting the beam upon, the support post, and with said pin receiving openings being shaped with a widened end portion, through which the pins may be freely passed for extending into and for being removed from the openings, and a lower, narrow portion which engages and traps the pins against endwise removal from the openings; said latch comprising:

a substantially rigid, flat sheet-like cover strip positioned upon said plate member and overlapping one of said pins and being secured rigidly to that pin so that the cover member is immovable relative to the plate;

a substantially flat, spring member strip overlapping the plate and having one end portion arranged between the cover member and the plate and being frictionally held therebetween, and with the spring member extending over and overlapping the second and third pins, each of which pins have an end portion extending through a corresponding opening formed in the spring member, with the spring member being resiliently bendable away from the plate and axially outwardly from the pins;

and with a latch keeper formed on the spring member, between the two pins extending therethrough, with the keeper pin passing through a corresponding hole in the plate and into the widened portion of the opening into which the third pin passes, so that the keeper pin retains said third pin in the narrow portion of its respective post opening for latching the pin against removal from the post opening;

whereby the three pins may be inserted into their respective post openings and moved into the narrow portions of said openings for fastening the beam to the post, and will be maintained against removal from those openings by the keeper pin engaged within the wider portion of one of those openings, but wherein the keeper pin may be moved to a position wherein it does not obstruct the movement of its respective pin into the wider portion of the opening by means of moving the spring member for permitting the pins to be disengaged from the post openings.

9. A latch as defined in claim 8, and the openings in the spring plate being slightly elongated in the direction of the length of the post, so that the spring plate may be moved parallel to the post a short distance.

10. A latch as defined in claim 8, and wherein said spring member may be manually bent, resiliently, away from the plate a sufficient distance for removing the keeper pin from the opening in the post for thereby permitting the pins to be moved to the wide portions of the openings for removal therefrom.

11. A latch as defined in claim 10, and including an opening formed in the plate and being overlapped by the cover member strip, and including an integral projection formed on the cover member strip which extends into and is snugly fitted within that opening for maintaining the position of the cover member upon the plate.

* * * * *